United States Patent
Lieven et al.

(10) Patent No.: US 11,548,611 B2
(45) Date of Patent: Jan. 10, 2023

(54) DOOR SYSTEM FOR AIRCRAFT FUSELAGE

(71) Applicant: Airbus Operations SAS, Toulouse (FR)

(72) Inventors: Patrick Lieven, Fronton (FR); Laurent Lache, Plaisance du Touch (FR); Pierre Dourel, Cornebarrieu (FR)

(73) Assignee: Airbus Operations SAS, Toulouse (FR)

( * ) Notice: Subject to any disclaimer, the term of this patent is extended or adjusted under 35 U.S.C. 154(b) by 697 days.

(21) Appl. No.: 16/559,919

(22) Filed: Sep. 4, 2019

(65) Prior Publication Data
US 2020/0079489 A1 Mar. 12, 2020

(30) Foreign Application Priority Data
Sep. 6, 2018 (FR) .................................... 1858017

(51) Int. Cl.
*B64C 1/14* (2006.01)
*E05B 17/00* (2006.01)

(52) U.S. Cl.
CPC .......... *B64C 1/143* (2013.01); *E05B 17/0025* (2013.01); *E05Y 2900/502* (2013.01)

(58) Field of Classification Search
CPC ..... B64C 1/143; B64C 1/1461; B64C 1/1407; E05B 17/0025; E05Y 2900/502
See application file for complete search history.

(56) References Cited

U.S. PATENT DOCUMENTS

| | | | |
|---|---|---|---|
| 4,479,622 A | 10/1984 | Howse | |
| 4,488,380 A | 12/1984 | Howse | |
| 7,909,289 B2 | 3/2011 | Perez-Sanchez | |
| 2009/0113954 A1 | 5/2009 | De Resseguier et al. | |
| 2017/0152676 A1* | 6/2017 | Raz | E05B 65/06 |
| 2017/0158305 A1* | 6/2017 | Werthmann | E05D 15/54 |
| 2018/0304982 A1* | 10/2018 | Curry | B64C 1/143 |
| 2020/0131815 A1* | 4/2020 | Poppe | B64C 1/1407 |
| 2021/0070416 A1* | 3/2021 | Buchet | E05C 9/08 |

FOREIGN PATENT DOCUMENTS

| | | |
|---|---|---|
| DE | 19825405 A1 | 6/1999 |
| DE | 10343627 A1 | 4/2005 |
| FR | 2898864 A1 | 9/2007 |
| GB | 868390 A | 5/1961 |
| GB | 2042060 A | 9/1980 |
| GB | 2188094 A | 9/1987 |

OTHER PUBLICATIONS

French Search Report; priority document, dated Apr. 17, 2019.

* cited by examiner

*Primary Examiner* — Rodney A Bonnette
(74) *Attorney, Agent, or Firm* — Greer, Burns & Crain, Ltd.

(57) ABSTRACT

In order to simplify the kinematics involved in opening an aircraft door, a plurality of mobile stop members is provided at the periphery of the door, these being intended to press against complementary stop arrangement provided on the door frame. A door control device is configured to bring the door from its closed position into a set-back intermediate position by moving it towards the interior of the compartment, and a stop arrangement control device is configured to allow the mobile stop members to be moved, when the door is occupying its set-back intermediate position, from a deployed locking position to a retracted unlocking position, allowing the door to be moved outward through the opening in the fuselage.

15 Claims, 8 Drawing Sheets

DOOR SYSTEM FOR AIRCRAFT FUSELAGE

CROSS-REFERENCES TO RELATED APPLICATIONS

This application claims the benefit of the French patent application No. 1858017 filed on Sep. 6, 2018, the entire disclosures of which are incorporated herein by way of reference.

FIELD OF THE INVENTION

The present invention relates to the field of door systems for aircraft fuselage, of the type comprising a door configured to be held in closed position by a pressure difference that is applied on either side thereof. This type of door is generally called "plug door."

The invention is applicable to any type of aircraft, and preferably to commercial airplanes. It is for example intended for the production of a passenger door or of a passenger and service door, or even any other door giving access to a pressurized compartment of the aircraft.

BACKGROUND OF THE INVENTION

From the prior art, door systems are known that use the pressure difference between a compartment and the outside of the aircraft, to keep the door in closed position against a door frame defined by the fuselage. To do this, the door is generally equipped with stop means arranged at its periphery, and cooperating with complementary stop means arranged on the door frame. In flight, the pressure difference that is applied on either side of the door forces the stop means against the complementary stop means. One of the particular features of this type of door, known as "plug door," lies in the fact that the pressure difference that is applied on either side of the door brings about an introduction of forces in the stop means and the complementary stop means, but little or no forces on the control device which is used to move the door between its various positions, and for the locking of the door.

One of the difficulties encountered in the design of these systems lies in the door opening and closing kinematics. In particular, the opening kinematics need to allow a disengagement of the stop means relative to the complementary stop means. In the prior art, this disengagement is carried out by performing a lifting of the door, that is to say by producing a vertical door movement or one with a very strong vertical component.

While this solution proves satisfactory, it does nevertheless require particular means to ensure the vertical movement of the door, with, in particular, the presence of a weight compensation system.

Consequently, there remains a need to optimize the design of the existing door systems, in order to mitigate the drawback described above.

SUMMARY OF THE INVENTION

The invention thus breaks dramatically from the prior designs, because it provides, on the door, stop members for which the transition from the deployed locking position to the retracted unlocking position is made possible by bringing the door into a set-back intermediate position. This position is obtained by moving the door toward the interior of the compartment, and no longer vertically as in the prior art.

The kinematics and the means implemented for the opening and the closing of the door are thereby simplified, particularly through the absence of a door weight compensation system.

The invention also presents at least one of the following optional features, taken alone or in combination.

Each mobile stop member has a first end articulated on the periphery of the door, and a second end opposite the first and forming an end for contact with the door frame.

The second end delimits a rounded contact surface.

The actuation membrane is secured to the mobile stop members. Other cooperation solutions are also possible between the actuation membrane and the mobile stop members, such as a simple pressing of these members on the membrane.

The stop means control device also comprises elastic return means, returning the mobile stop members to the retracted unlocking position, by generating a force opposing the pressure forces that are exerted on the actuation membrane inside the control chamber, the elastic return means being preferentially arranged inside the control chamber.

The actuation membrane forms a seal between the door and the door frame, the seal being continuous all along the periphery of the door.

The door control device comprises:
at least one control handle;
at least one control member driven by the control handle and mounted articulated on the door along an articulation axis, each control member defining a guiding track receiving a following member secured to the door frame.

The door control device is configured such that each control member can be rotated between a holding position and a release position, this rotation of the control member about the articulation axis, between its holding position and its release position, provoking a movement of the following member along the guiding track, conducting the door from its closed position to its set-back intermediate position.

In its holding position, the control member is prevented by the following member from being moved relative to the door frame, toward the interior of the compartment, and, in its release position, the control member can be moved outward relative to the door frame.

Another subject of the invention is an aircraft comprising a fuselage equipped with at least one such door system, preferably to form a passenger door or a passenger and service door.

Other advantages and features of the invention will emerge from the nonlimiting detailed description hereinbelow.

BRIEF DESCRIPTION OF THE DRAWINGS

This description is given in light of the attached drawings in which.

DETAILED DESCRIPTION OF THE PREFERRED EMBODIMENTS

Figure 1:
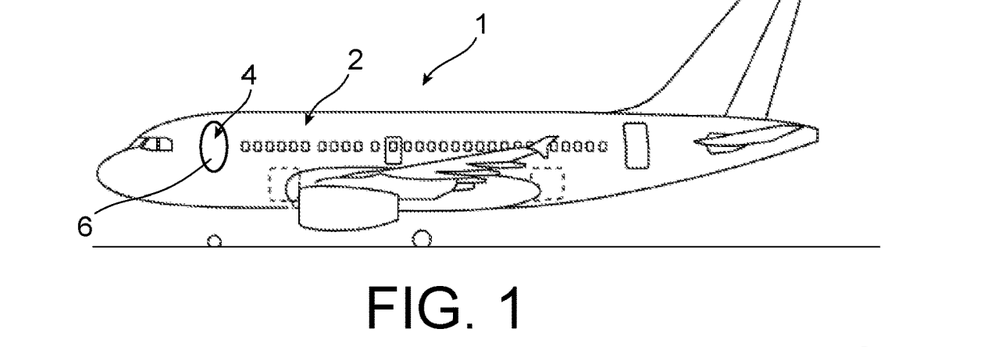
FIG. 1 represents a side view of an aircraft according to the invention.
Figures 2, 3:
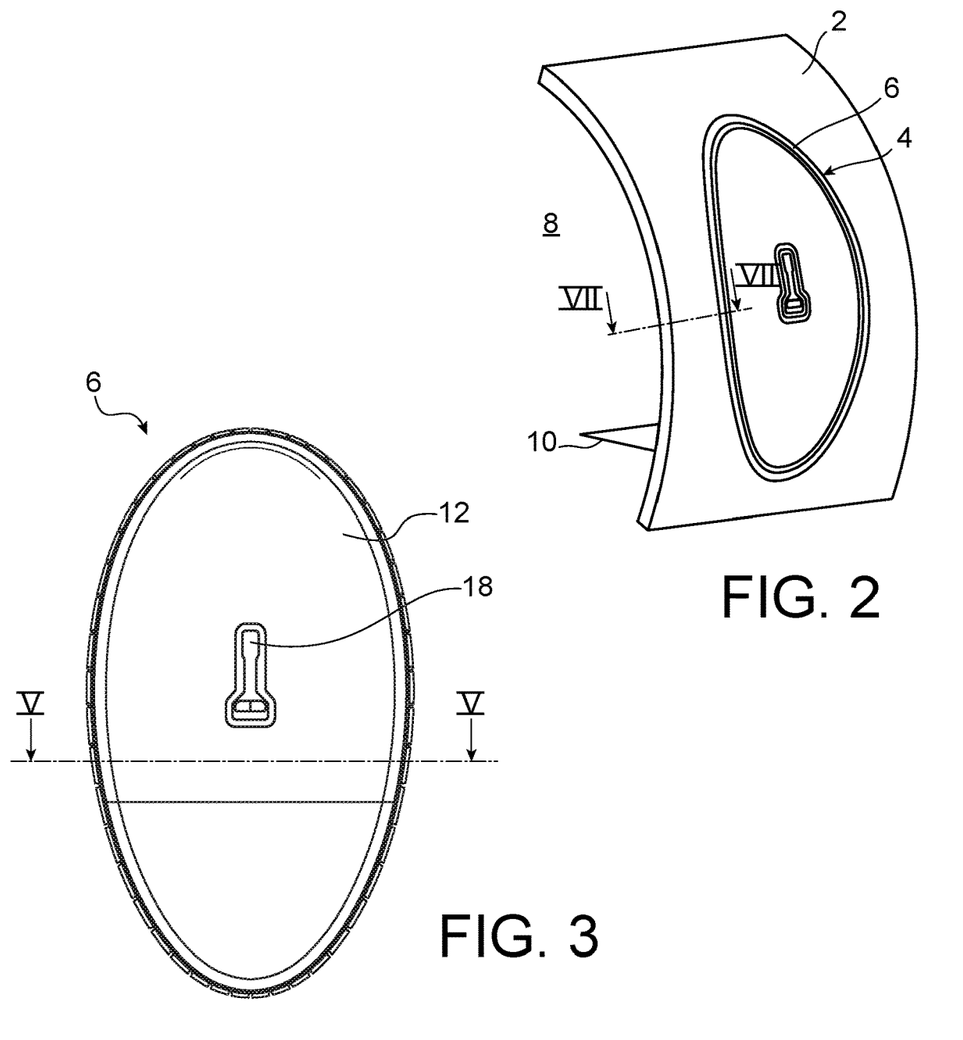
FIG. 2 represents a perspective view of a door system with which the aircraft shown in the preceding figure is equipped.
FIG. 3 represents a front view of the door with which the door system shown in the preceding figure is equipped.
Figures 4, 5:
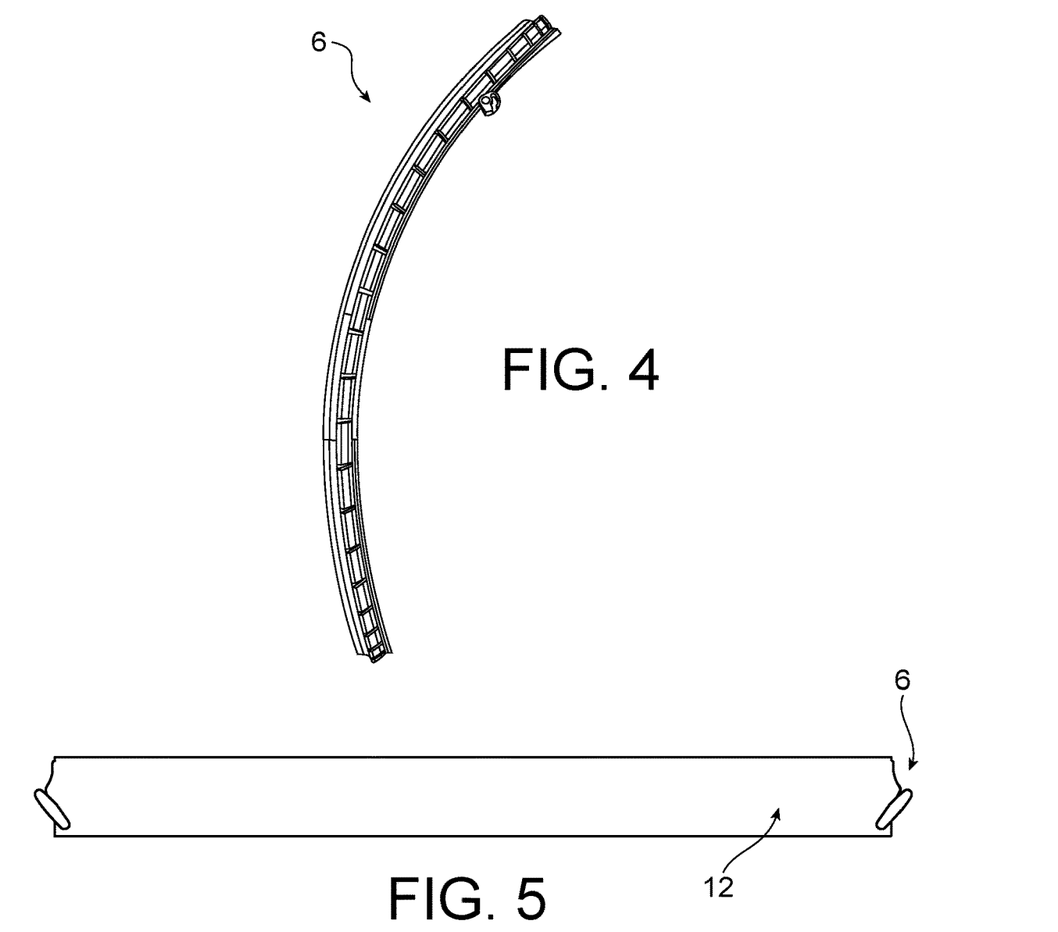
FIG. 4 represents a side view of the door shown in the preceding figure.
FIG. 5 is a cross-sectional view of the door, taken along the line V-V of FIG. 3.
Figure 6:
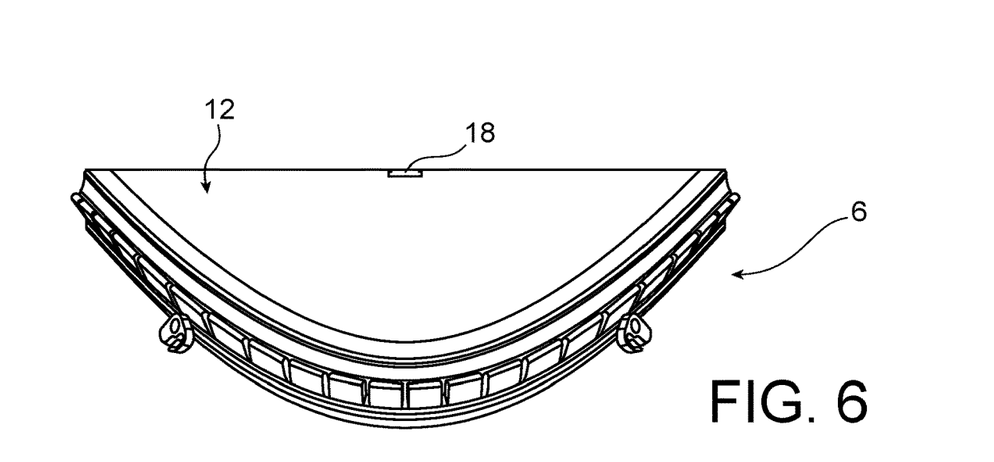
FIG. 6 is a plan view of a part of the door shown in the preceding figure.

FIG. 1 represents an aircraft 1, comprising a fuselage 2 equipped with a door system 4 according to the invention. This system 4 comprises a door 6 forming a passenger door giving access to a pressurized compartment 8 of the aircraft. The door 6 has, for example, a form of ovoid type visible in FIG. 2, and extends preferentially, on either side of a floor 10 onto which passenger seats (not represented) are fixed.

Now referring to FIGS. 3 to 6, the door 6 is shown in more detail, the door having a general form matching that of the fuselage. It comprises a main structure 12. On the outer surface of the main structure 12, an outside control handle 18 is provided.

Referring to FIGS. 7 to 10, the door system 4 and its control means are described in more detail.

Figure 7:
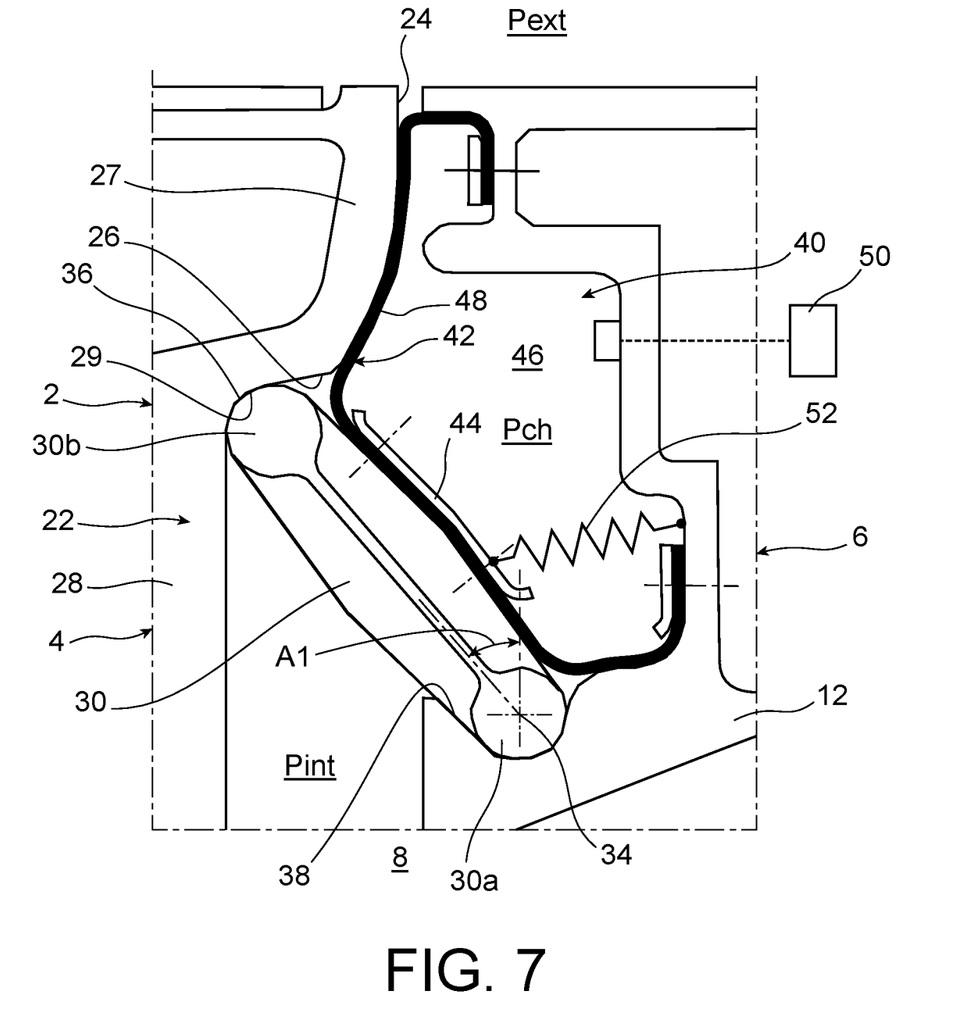
FIG. 7 is an enlarged cross-sectional view of a part of the door system shown in the preceding figures, the cutting line corresponding to the line VII-VII of FIG. 2.

The door system 4 comprises a door frame 22 delimiting an opening 24 in the fuselage 2, this opening giving access to the pressurized compartment 8. The overall form of this frame 22 corresponds to that of the door 6, since, in closed position thereof as shown in FIG. 7, the door blocks the opening 24 in a seal-tight manner. In this respect, it is indicated that the form of the cross section shown in this FIG. 7 corresponds to that encountered all along the join between the frame 22 and the periphery of the door 6.

The frame 22 has a seat 26 facing toward the interior of the compartment 8. This seat 26 is embodied by a widening of the opening 24. Indeed, after the seat 26 in the outward direction, the frame has an extension frame 27 defining a narrowing of the opening 24. Conversely, after the seat 26 in the direction of the compartment 8, the door frame 22 has an internal frame 28 defining a widening of the opening 24. A radius of curvature 29 can be provided between the seat 26 and the internal frame 28.

The door 6 has a design of "plug door" type, that is to say, its closed position of FIG. 7 is maintained in flight by virtue of the pressure difference on either side of this door. During the flight phase, the pressure inside the compartment 8, called "Pint," is effectively greater than the outside pressure "Pext," which forces the door 6 to press against the frame 22. For this, the periphery of the door 6 is equipped with stop means taking the form of a plurality of mobile stop members 30. These members follow one another all along the periphery of the door 6, leaving between them circumferential gaps 32 referenced in FIG. 10. Each mobile stop member 30 can be a flap, for example of generally rectangular form. A first end 30a of each stop member 30 is articulated on the periphery of the door 6, along an articulation axis 34 which is preferentially substantially parallel locally to a tangential direction of the door. A second end 30b, opposite the first end 30a, forms an end for contact with the door frame. More specifically, in closed position of the door 6, this second end 30b presses on the seat 26 of the frame 22, this pressing being able to be extended to the radius of curvature 29. To improve the contact, the second end 30b delimits a rounded contact surface 36, of a form complementing that of the radius of curvature 29. Consequently, the seat 26 and/or the radius of curvature 29 form complementary stop means, against which the members 30 are forced to press by virtue of the pressure difference that is applied on the either side of the door 6 during the flight. All, or almost all, of the forces resulting from the pressure difference that is applied on the door are introduced into these members 30, and into the complementary stop means receiving these members.

Each mobile stop member 30 here adopts a deployed locking position, in which their second end 30b protrudes from the periphery of the door. The opening angle A1 of each member 30 can be set by a stop 38 on the periphery of the main door structure 12.

The system 4 also comprises a stop means control device, this device bearing the overall reference 40 in FIG. 7. As will be explained later, this device 40 makes it possible, in certain particular circumstances, to provoke the movement of the mobile stop members 30 from their deployed locking position to a retracted unlocking position. This device 40 is stressed mechanically little or not at all when the door is held in closed position by the pressure difference prevailing on either side of this door.

The control device 40 comprises an actuation membrane 42, arranged at the periphery of the door, and preferentially secured to the mobile stop members 30. These members 30 are, in fact, fixed onto the outer surface of the membrane 42, for example via fixing plates 44 arranged on the inner surface of this membrane 42. The latter delimits, with the periphery of the door 6, a control chamber 46 for the members 30, which extends all along this periphery. The chamber 46 is intended to be filled with air, and its pressure, called "Pch," conditions the deployment of the membrane 42, and therefore opening angle A1 of the mobile stop members 30.

The external part of the membrane 42 forms a seal 48 between the door 6 and the door frame 22, this seal extending continuously all along the periphery of the door 6. When the actuation membrane 42 is deployed as in FIG. 7, the outer surface of this external membrane part rests in fact pressing on the extension frame 27 of the frame 22.

The control device 40 also comprises means 50 for controlling the pressure of the control chamber 46. These means 50 can be coupled to an air compressor making it possible to pressurize and/or depressurize the chamber 46, in order to drive the position of the membrane 42 and of the members 30 which are attached thereto.

Finally, the control device 40 comprises elastic return means, in the form of tension springs 52 linking the main door structure 12 to the fixing plates 44. These springs 52 exert a force returning the mobile stop members 30 to the retracted unlocking position, since this force opposes the air pressure forces that are exerted on the actuation membrane 42 inside the chamber 46. The springs 52 are arranged inside the control chamber 46, and they in fact make it possible to pull the membrane 42 toward the main structure 12, when the pressure in the chamber 46 drops below a determined value. Nevertheless, the presence of these springs is not mandatory, since the movement of the actuation membrane 42 could be performed exclusively by controlling the pressurization/depressurization of the chamber 46, via the means 50.

Figure 8:
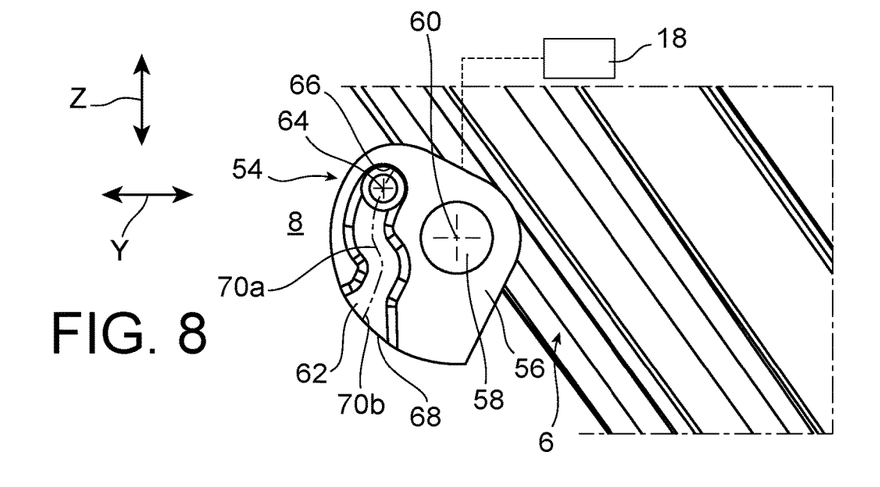
FIG. 8 represents a side view of a part of a door control device with which the system shown in the preceding figures is equipped.
Figure 9:
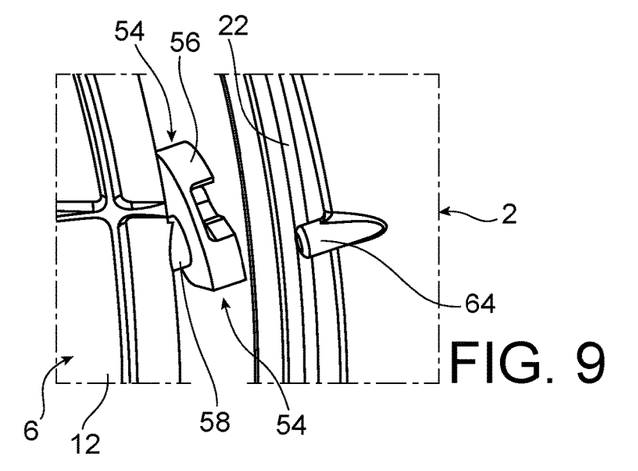
FIGS. 9 and 10 are perspective views, from different viewing angles, of a part of the control device shown in the preceding figure.
Figure 10:
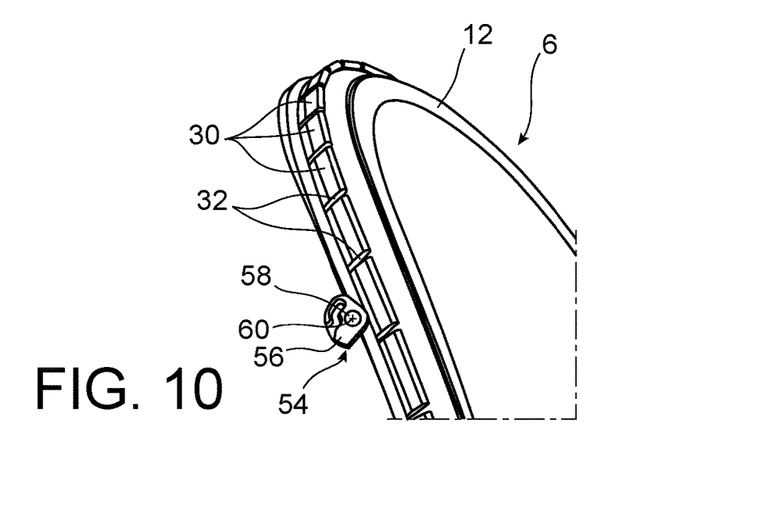

Moreover, the door system 4 comprises a door control device, this device bearing the overall reference 54 in FIGS. 8 to 10.

It comprises the external control handle 18 shown in FIGS. 3 to 6, but also an internal control handle (not represented). These two handles are embedded on the door 6, and can respectively be actuated from the outside of the aircraft, and from the pressurized compartment 8. They each drive, independently of one another, one or more control members 56 arranged at the periphery of the door, and linked to the handles by a transmission device (not represented). It is for example four control members 56 which are arranged at the periphery of the door.

More specifically, each control member 56 is mounted articulated on the periphery of the main door structure 12, around an articulation member 58 extending along an articulation axis 60. This axis 60 is preferentially orthogonal, locally, to the peripheral rim of the door 6.

The control members 56 are thus designed to be driven in rotation simultaneously by one of the two handles, from the outside or from the interior of the compartment 8. Each control member defines a guiding track 62 receiving a following member 64 secured to the door frame. The following member 64, preferably in the form of a pin, is substantially parallel to the articulation member 58 provided on the door 6.

The guiding track 62 is preferably a guiding rail, along which the following member 64 can be moved. This rail comprises a blocked first end 66, and an opposite second end 68 that is open and flared. The rail 62 defines a first path 70a which begins with the first end 66, and a second path 70b continuing the first, and ending with the second end 68.

The operation of the door system 4 will now be described. In flight phase, the door 6 is in closed position, with its mobile stop members 30 in deployed locking position. The pressure Pint inside the compartment 8 is greater than the external pressure Pext, such that the door 6 and its stop members 30 are forced outward, against the door frame 22. More specifically, these members 30 are forced to press against the seat 26 of the frame. The angle A1 shown in FIG. 7 cannot be increased, because of the stop 38 and the pressing of the members 30 against the internal frame 28 of the frame 22. Nor can this angle A1 be reduced, since the second end 30b of the members 30 is pressing on the seat 26, which prevents a rotation of the members 30 in this direction. In closed position of the door, the members 30 are held in their deployed locking position and thus prevented from being moved to their retracted unlocking position. This rotational blocking of the mobile stop members 30 is carried out whatever the pressure Pch inside the control chamber 46, which is for example set at the same value as the pressure Pint during the flight, or even more preferentially at a higher pressure.

It is also noted that during the flight, the control members 56 adopt a holding position shown in FIG. 8. In this holding position, the following member 64 is in the rail 62 at the first end 66 of the first path 70a. This first path 70a is of substantially circular form, and concentric to the articulation axis 60. The following member 64 is then gripped radially between two rail flanks situated on either side of this member 64. The control member 56 is thus prevented from being moved relative to the frame 22, in the transverse direction Y, by the following member 64 retained in the rail 62. In particular, the control member 56 is prevented from being moved in the transverse direction Y toward the interior of the compartment 8. This involves a mechanical stop which is added to the air pressure differential to prevent the door 6 from being moved transversally toward the interior of the compartment 8. Consequently, there is no possibility for the mobile stop members 30 from being retracted to their retracted unlocking position.

On the ground, after landing, the pressure Pint inside the compartment 8 is substantially identical to the external pressure Pext, corresponding to atmospheric pressure. Consequently, the pressure differential phenomenon no longer applies, and the closed position of the door 6 is ensured solely by the mechanical abutment of the following member 64 in the first end 66 of the first path 70a of the rail 62. This closed position of the door 6 is thus retained as long as one of the control handles 18 is not actuated by an authorized person.

Figure 11:
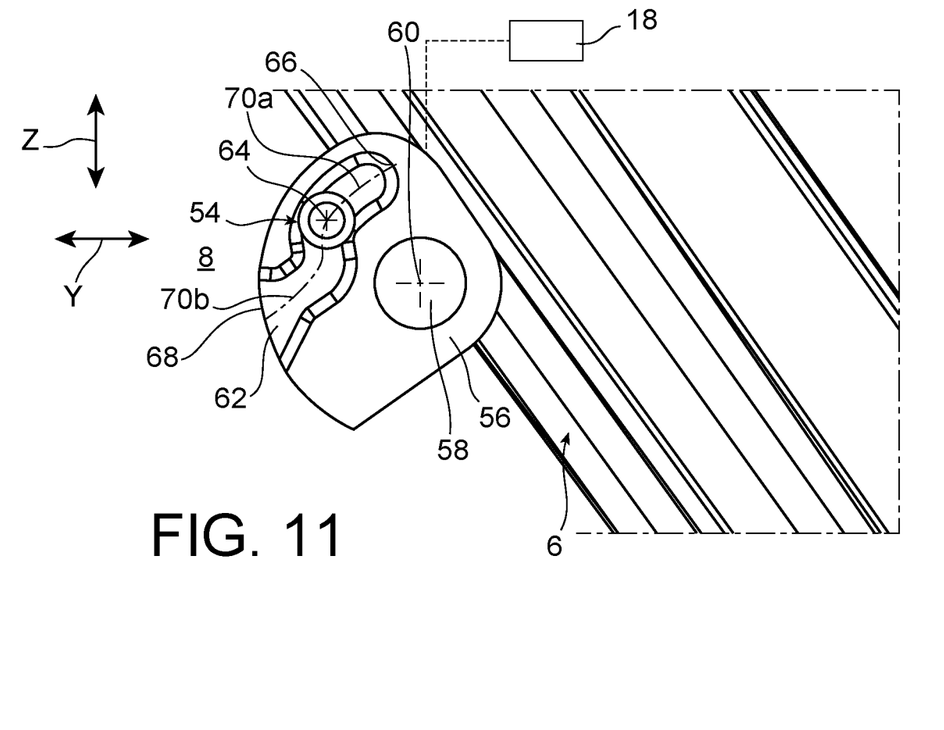
FIGS. 11 to 13, 13', 14 and 15 represent views similar to FIGS. 7 and 8, with the door system being in different states during a door opening operation.

On the ground, when the door 6 has to be opened, one of the two handles 18 is actuated, which causes the pivoting of the control member 56 about the articulation axis 60 to begin. During the initial phase of pivoting of this member 56, the following member 64 is moved in the rail 62, along the first path 70a. In this initial phase represented in FIG. 11, no relative movement occurs in the transverse direction Y between the door 6 and the door frame to which the following member 64 is secured. This initial phase can be used to trigger a pressure loss Pch in the actuation chamber 46 to culminate in the consequences which will be described hereinbelow.

In the second phase of pivoting of the member 56 about the axis 60, there is still observed a relative movement of the following member 64 in the rail 62, along the second part of the first path 70a. In this second part, which is no longer concentric to the axis 60, the distance from the path 70a to this axis 60 is reduced by approaching the second path 70b. Because of this reduction in distance, a transverse movement of the door 6 occurs relative to the door frame, toward the interior of the compartment 8.

Figure 12:
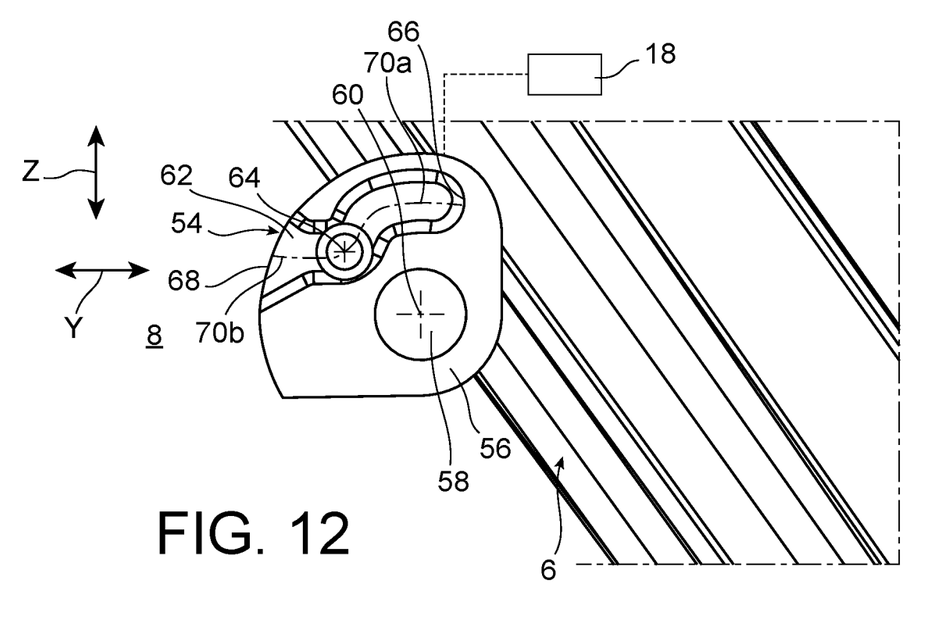

At the end of the pivoting of the control member 56 schematically represented in FIG. 12, that is to say after an amplitude of rotation of the order of 30 to 60° of this member 56, the latter then adopts a release position in which the following member 64 is at the join between the two paths 70a, 70b of the rail 62. Thus, in the movement from its holding position of FIG. 8 to its release position of FIG. 12, the member 56 provokes the movement of the following member 64 along the first path 70a, causing the door 6 to move toward the interior. This door 6 is then brought into a set-back intermediate position schematically represented in FIG. 13, in which it is effectively set back in the direction Y by a value "D" for example lying between 5 and 10 mm No displacement occurs in the vertical direction Z.

Once the door has been set back and the pressure Pch has been regulated to a desired value in the control chamber 46, for example to atmospheric pressure or to a lower pressure, the second end 30a of the stop members 30 is sufficiently offset from the seat 26 to allow a pivoting of these members 30 about the axis 34. This pivoting is carried out under the effect of the springs 52 forcing the actuation membrane 42 and the members 30 toward the periphery of the door 6, possibly in combination with the depressurization performed in the chamber 46 by suitable regulation of the pressure Pch.

Figure 13:
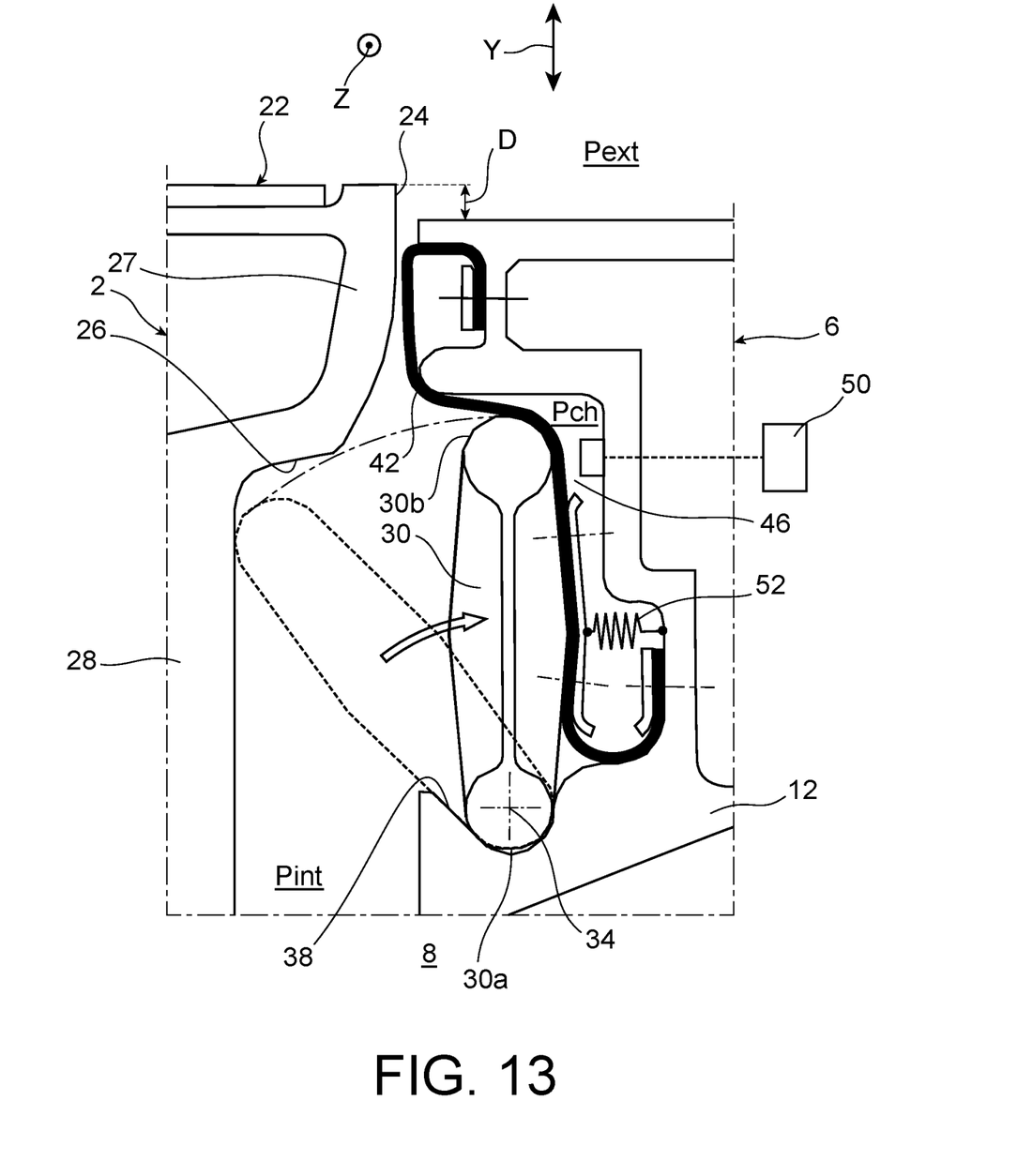

It is therefore these tension springs 52 which cause the mobile stop members 30 to be moved from their deployed locking position of FIG. 7 to the retracted unlocking position of FIG. 13. In this respect, it is noted that when the membrane 42 approaches the periphery of the door structure 12, folds 42' are formed in the spaces formed between the fixing plates 44, as is schematically represented in FIG. 13.

These membrane folds 42' make it possible to combat the reduction of the perimeter of the membrane 42, when it approaches the door periphery under the effect of the springs 52.

Figure 14:
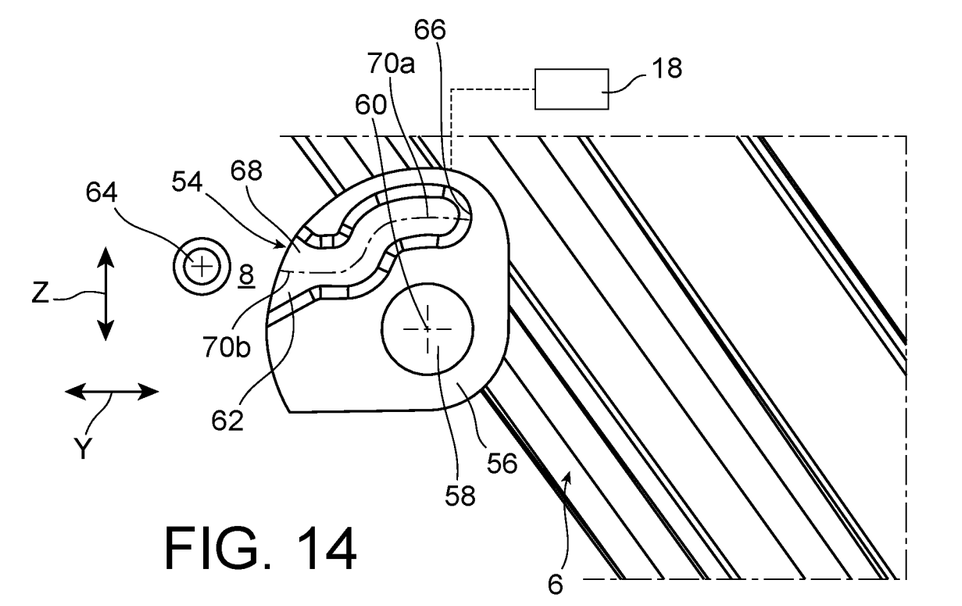
Figure 15:
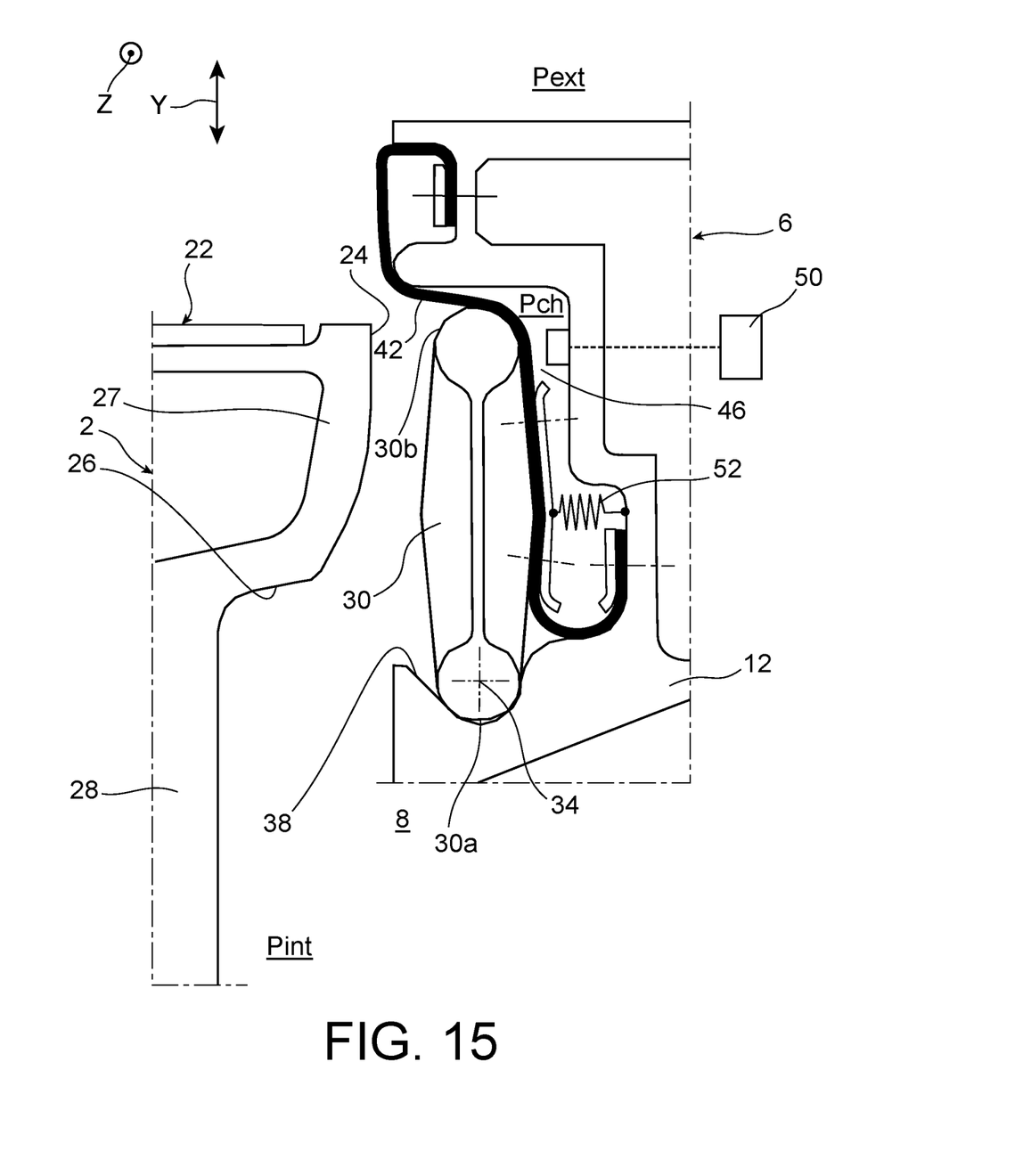

Finally, once this retracted position is adopted by the mobile stop members 30, the door 6 can be moved transversally outward through the opening 24 of the frame 22, passing through the narrowing formed by the extension frame 27. This movement schematically represented in FIG. 15, which movement is preferably only transverse and without vertical component, is allowed by the release position of the control member 56, shown in FIG. 14. Indeed, the second path 70b is then oriented substantially transversally, which means that the control member 56 can be moved in the direction Y relative to the frame 22, without being hampered by the following member 64. As represented in FIG. 14, the following member 64 then escapes by the second rail end 68 which follows the outward transverse movement of the door 6.

Once the door frame has been passed through by the door, the opening movement of this door remains conventional, preferably parallel to the fuselage, in order for the door to be able to be brought alongside the frame, against the fuselage. This movement is dictated by known means (not represented), of the guides and articulation arms type arranged at the interface between the door frame and the door.

During a door closure operation, the steps described above are carried out in the reverse direction. Nevertheless, provision is preferentially made for the transition of the mobile stop members 30 from their retracted unlocking position to their deployed locking position to be carried out before the movement of the door 6 from its set-back intermediate position to its closed position. This moving of the members 30, performed by the increasing of the pressure Pch in the chamber 46 via the means 50, can alternatively be performed during transverse movement of the door 6 to its closed position. In such a case, the deployment of the members 30 is performed sufficiently early during the movement of the door 6 for these members 30 to be able to reach their deployed unlocking position without abutting against the extension frame 27 of the door frame 22.

In light of the above, the deployment of the mobile stop members 30 is thus obtained when the pressure Pch applied in the chamber 46 induces, on the membrane 42, forces greater than those resulting from the pressure Pint and from the springs 52.

Obviously, various modifications can be made by the person skilled in the art to the invention which has just been described purely by way of nonlimiting examples and in accordance with the scope defined by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A door system for aircraft fuselage, the system comprising:
a door frame delimiting an opening in the fuselage, the opening giving access to a compartment of the aircraft;
a door provided to block the opening when the door occupies a closed position, this closed position of the door being intended to be maintained by pressure difference between the outside of the fuselage and the compartment;
stop means arranged at a periphery of the door, and intended to press on complementary stop means provided on the door frame,
wherein the system also comprises a door control device configured to bring the door from the closed position into a set-back intermediate position by moving the door towards the interior of the compartment and, vice versa, by moving the door outward,
wherein the stop means comprise a plurality of mobile stop members following each other along the periphery of the door,
wherein the system also comprises a stop means control device configured such that, when the door occupies the set-back intermediate position, a movement is provoked of the mobile stop members from a deployed locking position to a retracted unlocking position allowing the door to be moved outward through the opening in the fuselage,
wherein the system is configured so that, in the closed position of the door, the pressing of the mobile stop members, against the complementary stop means of the door frame, prevents these mobile members from being moved to their retracted unlocking position, and
wherein the stop means control device comprises:
an actuation membrane arranged at the periphery of the door and cooperating with the mobile stop members, the membrane delimiting a control chamber, the actuation membrane secured to the mobile stop members; and
pressure control means for the control chamber, the pressure inside the chamber conditioning the position of the membrane and that of the mobile stop members cooperating with this membrane.

2. The door system as claimed in claim 1, wherein each mobile stop member has a first end articulated on the periphery of the door, and a second end opposite the first and forming an end for contact with the door frame.

3. The door system as claimed in claim 2, wherein the second end delimits a rounded contact surface.

4. The door system as claimed in claim 1, wherein the stop means control device also comprises elastic return means, returning the mobile stop members to the retracted unlocking position, by generating a force opposing the pressure forces that are exerted on the actuation membrane inside the control chamber, the elastic return means being arranged inside the control chamber.

5. The door system as claimed in claim 1, wherein the actuation membrane forms a seal between the door and the door frame, the seal being continuous all along the periphery of the door.

6. The door system as claimed in claim 1, wherein the door control device comprises:
at least one control handle;
at least one control member driven by the control handle and mounted articulated on the door along an articulation axis, each control member defining a guiding track receiving a following member secured to the door frame.

7. The door system as claimed in claim 6, wherein the door control device is configured such that each control member can be rotated between a holding position and a release position, this rotation of the control member about the articulation axis, between the holding position and the release position, provoking a movement of the following member along the guiding track, conducting the door from the closed position to the set-back intermediate position.

8. The door system as claimed in claim 7, wherein, in the holding position, the control member is prevented by the following member from moving relative to the door frame, toward the interior of the compartment, and wherein, in the release position, the control member can be moved outward relative to the door frame.

9. An aircraft comprising a fuselage equipped with at least one door system as claimed in claim 1.

10. A door system for aircraft fuselage, the system comprising:
   a door frame delimiting an opening in the fuselage, the opening giving access to a compartment of the aircraft;
   a door provided to block the opening when the door occupies a closed position, this closed position of the door being intended to be maintained by pressure difference between the outside of the fuselage and the compartment;
   stop means arranged at a periphery of the door, and intended to press on complementary stop means provided on the door frame,
   wherein the system also comprises a door control device configured to bring the door from the closed position into a set-back intermediate position by moving the door towards the interior of the compartment and, vice versa, by moving the door outward,
   wherein the stop means comprise a plurality of mobile stop members following each other along the periphery of the door,
   wherein the system also comprises a stop means control device configured such that, when the door occupies the set-back intermediate position, a movement is provoked of the mobile stop members from a deployed locking position to a retracted unlocking position allowing the door to be moved outward through the opening in the fuselage,
   wherein the system is configured so that, in the closed position of the door, the pressing of the mobile stop members, against the complementary stop means of the door frame, prevents these mobile members from being moved to their retracted unlocking position,
   wherein the stop means control device comprises:
      an actuation membrane arranged at the periphery of the door and cooperating with the mobile stop members, the membrane delimiting a control chamber; and
      pressure control means for the control chamber, the pressure inside the chamber conditioning the position of the membrane and that of the mobile stop members cooperating with this membrane, and,
   wherein the door control device comprises:
      at least one control handle, and
      at least one control member driven by the control handle and mounted articulated on the door along an articulation axis, each control member defining a guiding track receiving a following member secured to the door frame.

11. The door system as claimed in claim 10, wherein the door control device is configured such that each control member can be rotated between a holding position and a release position, this rotation of the control member about the articulation axis, between the holding position and the release position, provoking a movement of the following member along the guiding track, conducting the door from the closed position to the set-back intermediate position.

12. The door system as claimed in claim 10, wherein, in the holding position, the control member is prevented by the following member from moving relative to the door frame, toward the interior of the compartment, and wherein, in the release position, the control member can be moved outward relative to the door frame.

13. An aircraft comprising a fuselage equipped with at least one door system as claimed in claim 10.

14. The door system as claimed in claim 10, wherein each mobile stop member has a first end articulated on the periphery of the door, and a second end opposite the first and forming an end for contact with the door frame.

15. The door system as claimed in claim 14, wherein the second end delimits a rounded contact surface.

* * * * *